US005933505A

United States Patent [19]

Bargauan

[11] Patent Number: 5,933,505

[45] Date of Patent: Aug. 3, 1999

[54] METHOD FOR INDIVIDUALLY ADJUSTING LEVELS OF SIGNALS IN AN OPERATION FOR MIXING SAID SIGNALS

[75] Inventor: Michele Bargauan, Milan, Italy

[73] Assignee: M.B. International S.r.l., Livigno, Italy

[21] Appl. No.: 08/888,911

[22] Filed: Jul. 7, 1997

[30] Foreign Application Priority Data

Jul. 29, 1996 [IT] Italy ........................ M196A1620

[51] Int. Cl.[6] ........................ H04B 1/00

[52] U.S. Cl. ........................ 381/119; 381/109

[58] Field of Search ........................ 381/119, 107–8, 381/109, 102–104

[56] References Cited

U.S. PATENT DOCUMENTS

| | | | |
|---|---|---|---|
| 4,885,792 | 12/1989 | Christensen et al. | 381/119 |
| 5,054,077 | 10/1991 | Suzuki | 381/119 |
| 5,060,272 | 10/1991 | Suzuki | 381/119 |
| 5,148,491 | 9/1992 | Sakamoto et al. | 381/119 |
| 5,177,801 | 1/1993 | Shoda et al. | 381/119 |
| 5,239,458 | 8/1993 | Suzuki | 381/119 |
| 5,259,034 | 11/1993 | Lumsden | 381/119 |
| 5,299,267 | 3/1994 | Nakamura | 381/119 |
| 5,317,641 | 5/1994 | Yasuda et al. | 381/119 |
| 5,414,776 | 5/1995 | Sims, Jr. | 381/119 |
| 5,623,551 | 4/1997 | East et al. | 381/119 |
| 5,652,800 | 7/1997 | Roberts | 381/119 |
| 5,757,941 | 5/1998 | McMillen | 381/119 |
| 5,774,567 | 6/1998 | Heyl | 381/119 |
| 5,802,185 | 9/1998 | Hansen | 381/119 |

FOREIGN PATENT DOCUMENTS

| | | | |
|---|---|---|---|
| 2601980 | 7/1977 | Germany | 381/119 |
| 3960734 | 9/1990 | Germany | 381/119 |

*Primary Examiner*—Forester W. Isen
*Assistant Examiner*—Xu Mei
*Attorney, Agent, or Firm*—Guido Modiano; Albert Josif

[57] ABSTRACT

A method for individually adjusting levels of signals in an operation for mixing the signals using a multichannel mixer, in which the level of each signal corresponds to the position of a corresponding slider, comprising the steps of: computing the total sum of the values that correspond to the positions of the corresponding sliders; calculating the percentage contribution of each signal, which corresponds to the position of each slider, with respect to the total sum; and adding the signals so as to obtain a resulting signal whose value is within a preset dynamic range which is allowable for the resulting signal.

5 Claims, 1 Drawing Sheet

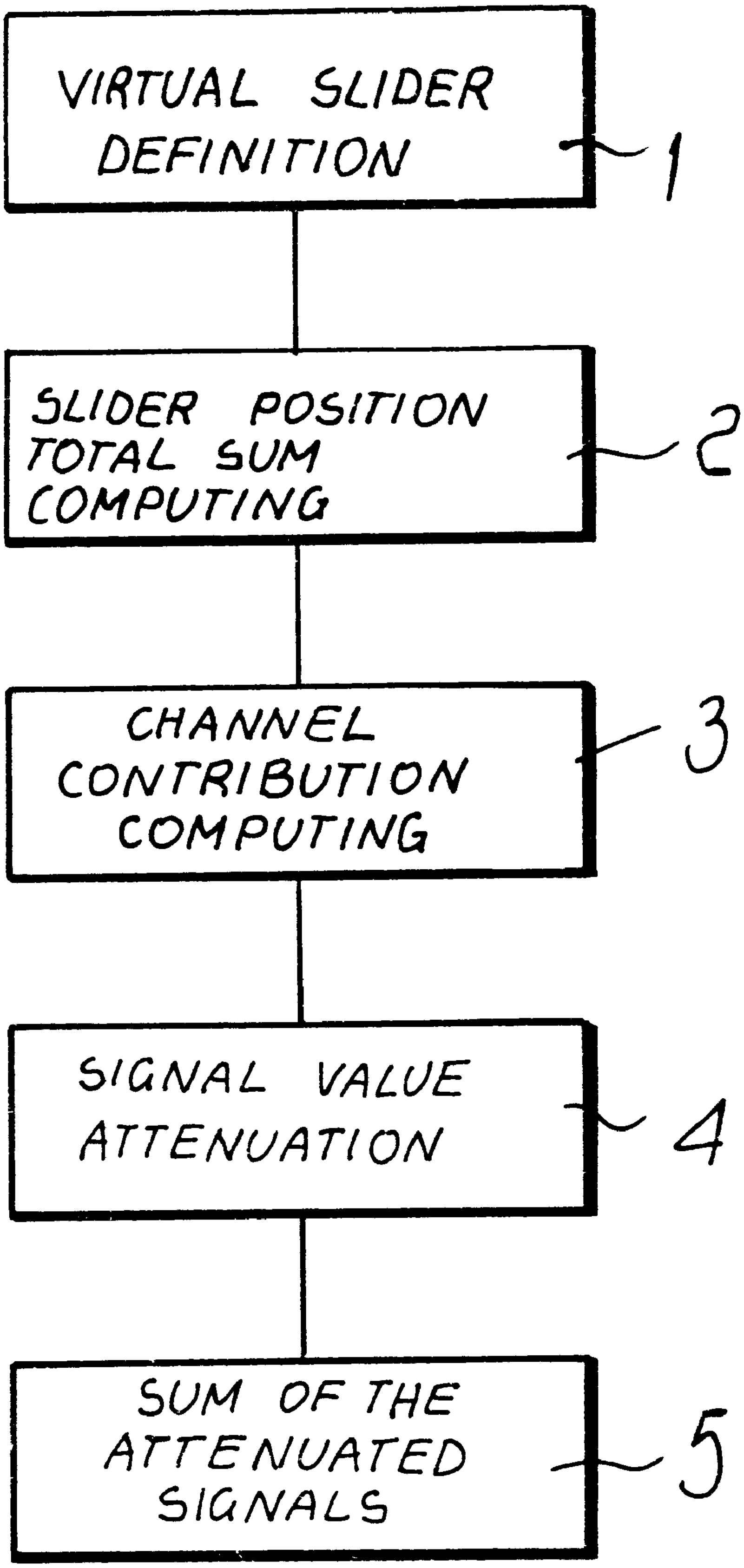
VIRTUAL SLIDER DEFINITION
1
SLIDER POSITION TOTAL SUM COMPUTING
2
CHANNEL CONTRIBUTION COMPUTING
3
SIGNAL VALUE ATTENUATION
4
SUM OF THE ATTENUATED SIGNALS
5

METHOD FOR INDIVIDUALLY ADJUSTING LEVELS OF SIGNALS IN AN OPERATION FOR MIXING SAID SIGNALS

BACKGROUND OF THE INVENTION

The present invention relates to a method for individually adjusting levels of signals in an operation for mixing said signals, in which one seeks to vary at will the intensity of an audio or video signal so as to obtain particular effects.

The method of subjectively mixing signals by using an adjustment device for each signal, so as to determine for each signal the absolute quantity, i.e., the intensity, and then add it to the other signals in order to obtain the complete signal, is commonly known in the art.

This method is used extensively in audio and video mixers.

A drawback of the above-mentioned method is the fact that the output signal, which is composed of the sum of a plurality of signals whose value is intensity-adjusted, has a dynamic range which cannot be determined beforehand; therefore, an additional adjustment is required in order to maintain it within the intended limits, thus maintaining a preset dynamic range.

In audio mixing, for example, the value of the maximum dynamic range that the total signal must have, and beyond which unwanted distortion is introduced, is known.

The dynamic range of a signal is defined as the difference between the maximum and minimum values of said signal. Therefore, although the dynamic range of an individual signal is known, the dynamic range of the total signal produced by the sum of a plurality of signals is certainly not known beforehand.

In order to limit the dynamic range of the output signal produced by the sum of the individual signals, so as to maintain an intended final dynamic range, it is necessary to use a dynamic range compressor, which is generally constituted by a variable attenuator, a fixed-gain amplifier, and a feedback circuit: the output voltage of the amplifier, by means of the feedback network, acts on the attenuator, decreasing attenuation as the level of the output signal decreases.

Another drawback of the above method is the fact that when using digital signals, as a consequence of mixing, the result can go into overflow or may not have a sufficient dynamic range once it has been rounded to the final precision.

SUMMARY OF THE INVENTION

The aim of the present invention is to provide a method for individually adjusting the levels of signals in an operation for mixing said signals which allows to obtain an output level of the signal obtained from the mixing whose value is independent of the individual adjustments of the various component signals.

Within the scope of this aim, an object of the present invention is to provide a method for individually adjusting levels of signals in an operation for mixing said signals which allows to avoid altering in output, as a consequence of the individual adjustments of the different signals, the intended dynamic range of the signal produced as a result of mixing.

Another object of the present invention is to provide a method for individually adjusting the levels of signals in an operation for mixing said signals which allows to eliminate problems related to overflow in the mixing of digital signals.

Another object of the present invention is to provide a method for individually adjusting levels of signals in an operation for mixing said signals which can be implemented by using virtual devices.

Another object of the present invention is to provide a method for individually adjusting levels of signals in an operation for mixing said signals which is suitable to mix both audio signals and video signals.

Another object of the present invention is to provide a method for individually adjusting levels of signals in an operation for mixing said signals which allows to eliminate the attenuator used in conventional methods to limit the dynamic range of the sum signal.

Another object of the present invention is to provide a method which is highly reliable and relatively easy to provide and at competitive costs.

This aim, these objects and others which will become apparent hereinafter are achieved by a method for individually adjusting levels of signals in an operation for mixing said signals by means of a multichannel mixer, in which the level of each signal corresponds to the position of a corresponding slider, comprising the steps of:

computing the total sum of the values that correspond to the positions of the corresponding sliders;

calculating the percentage contribution of each signal, which corresponds to the position of each slider, with respect to said total sum; and adding the signals so as to obtain a resulting signal whose value is within a preset dynamic range which is allowable for said resulting signal.

BRIEF DESCRIPTION OF THE DRAWINGS

Further characteristics and advantages of the present invention will become apparent from the following detailed description of a preferred but not exclusive embodiment of the method according to the invention, illustrated only by way of non-limitative example in the accompanying drawings, wherein the only FIGURE is a flowchart which illustrates the steps of the method according to the invention.

DESCRIPTION OF THE PREFERRED EMBODIMENTS

With reference to the above-cited only FIGURE, the method according to the invention, applied to a multichannel mixer with respective adjustment sliders, comprises a first step 1 which consists in defining a virtual slider whose value is equal to the minimum increment that can be assigned to each one of a plurality of signals to be mixed.

The need for the virtual slider will be explained hereinafter.

Then, step 2, the total sum of the position of the sliders is computed so as to obtain a total reference value.

At this point, step 3, the contribution of each channel to the previously computed total value is calculated. In order to obtain this, the value of each slider, i.e., the intensity of the signal defined by the position of the corresponding slider, is divided by the total value computed in step 2.

Then, step 4, the value of each signal that corresponds to the position of the corresponding slider is attenuated by multiplying it by the contribution provided by that signal to the total sum.

Finally, step 5, the various signals thus attenuated are added to obtain the final sum signal.

The virtual slider defined earlier has the purpose of allowing the output signal not to be indefinite in case of nil component signals.

In fact, if the virtual slider is not present and if the individual signals related to the sliders of the mixer are nil, then the total sum of the various channels (step 2) would be zero and the subsequent step for computing the contribution of each signal to the total value (step 3), provided by dividing the value of each channel by the total value (sum), would lead to a division operation in which a zero value is divided by the zero sum. This would entail an indefinite division value (mathematically speaking, it would lead to an indefinite result).

The introduction of the virtual slider allows, in case of nil values of all the other signals, to obtain in output a minimum signal whose value is equal to the value of the virtual slider, and therefore allows to avoid falling into an indefinite condition.

In practice, it has been observed that the method according to the invention fully achieves the intended aim and objects, since it allows to obtain in output a signal which is the sum of the various mixed signals and in any case has a dynamic range which can be maintained within preset limits independently of the individual intensity (amplitude) adjustments performed on the various signals that compose the output signal.

This characteristic is also considerably interesting in the field of the processing of digital signals, where there is no longer the danger of falling into an overflow condition or of not having a sufficient dynamic range.

Another advantage obtained by using the method according to the invention relates to the possibility of using virtual sliders such as a mouse, joysticks, touchpads and the like instead of conventional physical sliders.

Automatic adjustment within a preset dynamic range allows the operator to concentrate exclusively on the intended effects, completely avoiding the need to check whether the allowable dynamic range for the signal produced by mixing is exceeded or not.

The method thus conceived is susceptible of numerous modifications and variations, all of which are within the scope of the inventive concept.

Thus, for example, it is possible to provide a total value of the individual channels which is different from a unitary value, so as to obtain particular effects. The total value is adjusted by an additional control.

Another possible embodiment is provided by the use of sliders provided by means of incremental transducers: in this case, each channel can increase its value to infinity by successive pulses and even reduce the values of the other channels to zero.

Another different embodiment is provided by the use of sliders which have a nonlinear characteristic in the space and time domain: small movements of the sliders within a certain period of time generate a variation in the value of the signal corresponding to that given slider which increases with a geometrical progression.

Instead, when the time interval between one movement and the next has a higher value, the variation of the resulting signal maintains a unitary value which corresponds to the value of the movement of the corresponding slider.

It is possible to use multichannel mixers in which the various sliders can be, at will, of the conventional type or of the type according to the invention: in case of use of conventional sliders, the individual sliders act in additive mode and their variations are added as they are, whilst if one chooses to use sliders according to the manner described in the present invention, the sliders provide for a percentage contribution.

Finally, all the details may be replaced with other technically equivalent elements.

In practice, the materials employed, so long as they are compatible with the specific use, as well as the dimensions, may be any according to requirements and to the state of the art.

What is claimed is:

1. A method for individually adjusting levels of signals in an operation for mixing said signals by means of a multichannel mixer with corresponding sliders, in which the level of each signal corresponds to the position of a corresponding slider, comprising the steps of:

computing the total sum of the values that correspond to the positions of the corresponding sliders;

calculating the percentage contribution of each signal, which corresponds to the position of each slider, with respect to said total sum;

attenuating each signal by multiplying the value of each signal, which corresponds to the position of the related slider, by the percentage contribution thereof, obtaining attenuated signals; and adding the attenuated signals so as to obtain a resulting mixed signal whose value is within a preset dynamic range which is allowable for said resulting mixed signal;

an increase or decrease of one slider position, corresponding to an increase or decrease of the level of one signal, being respectively related to a decrease or increase of the levels of all the other signals.

2. A method according to claim 1, further comprising a step of defining a virtual slider, the value of said virtual slider being computed in order to define said total sum.

3. A method according to claim 2, wherein said virtual slider has a value which is equal to the minimum possible increment of the sliders of said multichannel mixer.

4. A method according to claim 1, wherein said sliders have a nonlinear characteristic in the space and time domain.

5. A method according to claim 1, wherein said sliders are incremental sliders.

* * * * *